Figure 1:
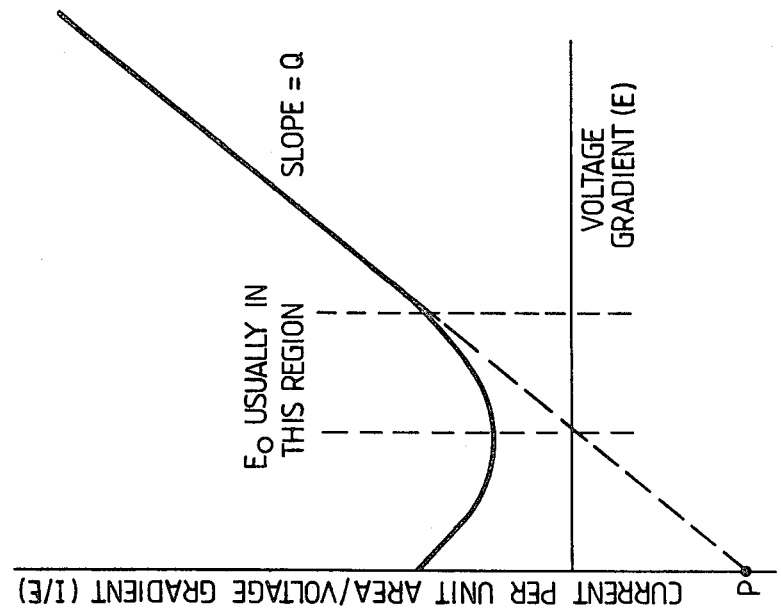

United States Patent [19]

Stangroom et al.

[11] Patent Number: 4,483,788
[45] Date of Patent: Nov. 20, 1984

[54] ELECTRIC FIELD RESPONSIVE FLUIDS

[75] Inventors: James E. Stangroom, Castleton; Ian Harness, Sheffield, both of England

[73] Assignee: The National Research Development Corp., London, England

[21] Appl. No.: 475,218

[22] Filed: Mar. 14, 1983

[30] Foreign Application Priority Data

Mar. 25, 1982 [GB] United Kingdom ............... 8208857

[51] Int. Cl.$^3$ .......................... H01B 3/20; C10M 1/08
[52] U.S. Cl. ...................................... 252/578; 252/58; 252/73; 252/76; 252/79; 252/308; 252/315.1; 252/581; 528/165
[58] Field of Search .................. 252/73, 76, 79, 578, 252/581, 58, 308, 315.1; 528/165

[56] References Cited

U.S. PATENT DOCUMENTS

| | | | |
|---|---|---|---|
| 2,165,813 | 7/1939 | Prutton | 252/581 |
| 3,472,782 | 10/1969 | Nowotny | 568/639 |
| 4,033,892 | 7/1977 | Stangroom | 252/76 |
| 4,260,506 | 4/1981 | Munch et al. | 252/581 |

FOREIGN PATENT DOCUMENTS

| | | |
|---|---|---|
| 53-96980 | 8/1978 | Japan . |
| 1501635 | 2/1978 | United Kingdom . |
| 1570234 | 6/1980 | United Kingdom . |

*Primary Examiner*—Paul Lieberman
*Assistant Examiner*—Robert A. Wax
*Attorney, Agent, or Firm*—William R. Hinds

[57] ABSTRACT

An electroviscous (EV) fluid composition whose fluid properties are altered in the presence of an electric field comprises water-containing particles of a phenol-formaldehyde polymer dispersed in a non-conducting liquid. The composition, selected from the broad range of fluid compositions of UK Pat. No. 1570234, possesses improved fluid properties combined with markedly reduced electrical conductivity, and is thus more suitable for use in applications such as at the interface between electronics and power hydraulics for example.

In a preferred embodiment of the present invention the polymer comprises the dilithium salt of 2,2', 4,4' tetrahydroxybenzophenone condensed with formaldehyde, dispersed at 30% V/V in a mixture of brominated diphenyl methane (BDM) liquid components having the averaged formula $C_6H_4Br.CH_2.C_6H_5$.

10 Claims, 2 Drawing Figures

ELECTRIC FIELD RESPONSIVE FLUIDS

This invention relates to electroviscous (hereinafter referred to as "EV") fluids.

EV fluids generally comprise suspensions of finely-divided, solid particles dispersed in liquids. They normally exhibit approximately Newtonian flow characteristics. However, when an electric field is applied, this behaviour is rapidly and reversibly changed to that of a Bingham plastic; under these conditions, the yield-point is observed to be a function of the magnitude of the applied electric field. The electrical conductivity of these fluids is generally quite low, so the electrical power input required to give rise to this change in behaviour is also low, although quite high voltage gradients are required. Hence, electrical heating of the fluid is seldom observed to any significant extent. The properties of EV fluids may be exploited in a number of applications, for example at the interface between electronics and power hydraulics, at which interface the flow of EV fluid is directly controlled by a variable electric field.

Ideally, an EV fluid is usable over a wide working range of electric field strengths and has a high EV response (a term used to express the change of fluid yield point with field strength) and a very high electrical resistance within that range. The solid particles are generally regarded as the active component within an EV fluid which are partly or wholly responsible for lending to the fluid EV characteristics. The liquid component acts as a vehicle for the solid particles, but can also greatly influence the activity of the final fluid. In addition, it should have properties compatible with engineering and electrical use, such as density comparable with that of the solid particles, hydrophobic character, low viscocity, high boiling point, low freezing point, high electrical resistance, and high dielectric strength.

The specific properties the solid particles have been found to require in order to lend EV characteristics to a fluid are that they should be hydrophilic, sufficiently porous to be capable of absorbing a certain amount of water (typically at least 10% by weight), and contain ionizable groups enabling the water to acquire an electric charge with respect to the solid in which it is absorbed and retained. It is believed that these properties are essential to the basic mechanism, which appears to involve the movement of water within the solid particles under the influence of the applied field. The water binds neighbouring particles together, thus leading to the observed yield point. Other more general properties the solids should possess include a moderate density, insolubility in any chosen hydrophobic liquid, chemical stability and simplicity of manufacture.

U.K. Pat. No. 1,570,234 discloses a broad range of polymeric solids suitable for use in an EV fluid. They are all characterized by containing free or neutralized acid groups within certain limits of water absorbency and density, and may be categorized as being either water-soluble or water-insoluble. Those solids selected from the above Patent which generally contribute the best combination of EV properties (including EV response) to liquids into which as particles they are dispersed, are, of the water-soluble polymers, lithium polymethacrylate (LPMA) as disclosed in Example 6 of the above Patent, and of the water-insoluble polymers, LPMA cross-linked with N,N'-methylene bis acrylamide (MBA) as disclosed in Example 8 of the above Patent.

The water-soluble polymers generally exhibit a higher EV response than the water-insoluble polymers when made up as EV fluids, and are also cheaper and easier to manufacture, but their solubility does give rise to a distinct disadvantage in use. Water absorbed into the pores of the polymer structure tends to partly dissolve and resolidify the solid particle within the EV fluid, causing them to stick together as they come into contact with one another and form large particle aggregates over long periods of time. This effect is known as "cold-welding". Water-soluble polymers are therefore unsuitable for many practical applications because of their poor long-term stability, which lends considerable weight of importance to those polymers which may be rendered insoluble by the use of cross-linking agents, but retain their hydrophilic character.

MBA cross-linked MPLA is one of the best examples of the insoluble cross-linked polymers known in the art. It has a low-to-moderate density which makes it compatible with the densities of a number a suitable non-conducting liquids. Being cross-linked, it is insoluble in water, although it will swell; the degree of swelling can be controlled by the amount of MBA included in the polymer. EV fluids containing this cross-linked polymer generally possess fairly good EV response characteristics, and these characteristics are not unduly sensitive to changes in the polymer's water content when compared with EV fluids containing other polymers known in the art. This polymer does however suffer from a number of disadvantages, both as a polymeric solid per se and when made up as polymer particles in an EV fluid. In its preparation, an initiator compound is required in order to initiate polymerization of the reagents. This compound together with unreacted reagents present at the end of the polymerization reaction must be completely removed from the resulting polymer gel by very extensive washing. Moreover, because the polymerization reaction actually involves two reactions which proceed side-by-side, but at different rates, the resulting polymer may be of variable composition when prepared in a simple batch process. These two reactions are the polymerization reaction of the primary monomer (methacrylic acid), and the cross-linking reaction of the MBA between polymer chains. One practical disadvantage of this variability of polymer composition is that the polymer particles may be non-uniform in density, which means that the particles cannot readily be density-matched with a hydrophobic liquid when making up an EV fluid without some of the particles settling out. This in turn gives rise to an EV fluid whose composition will vary with time if it is not periodically agitated, which is a particularly serious problem in static applications.

It is an object of the present invention to provide an improved hydrophilic solid selected from the broad range of polymers claimed in U.K. Pat. No. 1,570,234 for use in an EV fluid in which these disadvantages are overcome or at least mitigated.

Accordingly, an electroviscous fluid (EV fluid) composition comprises, in dispersion in an electrically non-conducting hydrophobic oleaginous vehicle, water-containing particles of a polymer having free or neutralized acid groups, density of not greater than 1.8 g cm$^{-3}$ and a water absorbency such that a sample thereof, after being allowed to equilibrate with moist air at 20° C., loses at least 8% of its weight when heated to constant weight under vacuum at a temperature which does not cause decomposition of the polymer, and regains at least 40% of this loss in weight when exposed to air at an ambient relative humidity of about 60% and a temperature of 20° C., wherein the polymer is a phenol-formaldehyde polymer.

The phenol employed in the formation of the polymer of this invention is any aromatic compound in which at least one of the aromatic hydrogen atoms has been replaced by a hydroxyl group at a first position, and in which at least two aromatic hydrogen atoms remain either in ortho or in ortho and para relationship to the said hydroxyl group. Preferably, the phenol has the general formula I

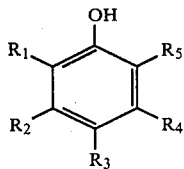

in which either each of $R_1$-$R_5$ is H, OH,

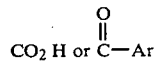

(Ar being an optionally-substituted pheny group) provided that at least two of $R_1$, $R_3$, and $R_5$ are H, or $R_1$ and $R_3$ are H, $R_2$ is H, OH, or $CO_2H$ and $R_4$ and $R_5$ are taken together and are —$CR_6$=$CR_7$—$CR_8$=$CR_9$— wherein each of $R_6$-$R_9$ is H, OH, or $CO_2H$, provided that at least one of $R_6$-$R_9$ is OH, and at least two of $R_6$-$R_9$ are H in either ortho or ortho and para relationship with said OH.

In one particularly preferred embodiment of this invention the polymer is formed by condensing the dilithium salt of 2, 2', 4,4' tetrahydroxybenzophenone with formaldehyde.

The electrically non-conducting oleaginous vehicle preferably contains at least one liquid of the type disclosed in U.K. patent application No. 8,118,885 which is a mixture of components having the general formula II

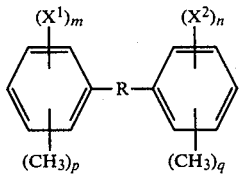

wherein R is $CY_2$, O, S, $SO_2$, $SiF_2$, or O—$Si(Y_2)$—O, $X^1$ and $X^2$ are either the same or different and are F, Cl or Br, (m+n) has an average value of from 1 to 3, each of p and q has an average value of from 0 to 2, (p+q) has an average value of from 0 to 1, and Y is H, F, or a methyl or ethyl group. The term "average value" as used above refers to the number of those molecular groups present per molecule of general formula II, averaged over all the components which when mixed comprise the liquid. Most preferably, at least one of the preferred liquids is a mixture of brominated diphenyl methanes (hereinafter referred to as BDM) wherein R is $CH_2$, $X^1$ and $X^2$ are Br, one of m or n is zero, (m+n) has an average value of about 1 and both p and q are zero.

The above preferred liquids may be used alone or mixed with other liquids such as polymers of trifluorovinyl chloride eg Flurolube F5-S (registered Trade Mark), polychlorinated biphenyls eg Aroclor 1242 (registered Trade Mark) and other compatible and miscible liquids (such as those disclosed in U.K. Pat. Nos. 1,501,635 and 1,570,234) to achieve a desired density or viscosity etc. The preferred liquids are not completely miscible with all such diluents, and show miscibility ranges which are sensitive to temperature so that care must be taken to select mixtures miscible throughout the desired range of working temperature. The preferred liquids (and BDM in particular) used in EV fluids have the advantage over other liquids known in the art in that they not only lend desirable EV properties to the fluids as a whole but are also significantly cheaper, less toxic, and more easily biodegraded than liquids such as Aroclor 1242 (registered Trade Mark) which had been previously regarded as one of the most advantageous liquids for this application.

The volume fraction of polymer particles used in the EV fluid of the present invention will depend on the base liquid. In practice the limiting factor in determining the amount of polymer particles used is the increasing viscosity accompanied by non-Newtonian behaviour in the absence of an electric field at high polymer particle contents. With suitable liquids and suitably treated polymer particles, volume fractions as high as 50% polymer particles may be used. Detectable EV activity may be found as low as 10% V/V polymer particles in liquids, but not only are such EV fluids very feeble, but the electrical power input in relation to the mechanical change resulting is much higher than when the polymer particle content is higher. A polymer particles content of 25–35% by volume has been found to be generally most suitable when the preferred liquids are used.

In order that valid comparison be made between EV fluids containing any of those polymer particles disclosed in U.K. Pat. No. 1,570,234 and EV fluids of the present invention, it is desirable that examples of the former and latter fluids be prepared and tested in an as near as possible identical manner. It is thus advantageous to compare EV fluids made up using the same liquids, the same volumetric quantities of polymer particles, and the same polymer particle size distribution for example, to ensure that the only difference between the fluids is the chemical composition of the particles.

Two factors which are known to affect the performance of an EV fluid are fluid temperature and the water content of the polymer particles. The former factor may be compensated for by testing the fluids at the same temperature, but the latter, which affects EV fluid electrical conductivity in particular, is more difficult to deal with because as the polymer particles are hygroscopic and swell to form gel-like materials in water, precise measurements of water content are extremely difficult to make, and the definition of a true dry state impossible. This difficulty is not important in operational terms because here only an approximate knowledge of water content and how it will effect EV performance is required, but it can obscure the validity of EV performance results used to compare EV fluids containing different polymers if not satisfactorily resolved.

One useful measure of water content may be to relate it, as in U.K. Pat. No. 1,570,234, to an arbitrary "dry" state as achieved by drying in vacuo at 50° C. to 60° C. A further useful measure of water content may be derived from the current/voltage relationship of the EV fluid. Thus as further described below, beyond a certain voltage gradient (or voltage across a given gap containing the fluid) the relationship of (dc current density/-voltage gradient across the gap) to voltage gradient is linear having a slope termed Q. For a given polymer particle/liquid combination, log Q is approximately linearly related to the water content of the polymer particles, and hence Q may be used as a practical measure of water content for that combination. However, when comparing EV fluids whose primary difference lies in the chemical composition of their respective polymer particle content, making valid quantitative comparisons of EV performance between fluids of equivalent particle water content is not possible using the latter measure of water content because the linear relationship between log Q and water content has been found to be unique for each polymer. In these cases the former measure of water content, though arbitrary in absolute terms, is therefore more useful, particularly when an equally arbitrary "wet" state is also defined for all the polymer particles used in the EV fluids compared. The two states thus give a fairly standard range of polymer particle water content over which comparisons may be made when the particles are made up in EV fluids.

A preferred EV fluid composition comprises polymer particles suspended at 30% V:V in liquid BDM, which particles are formed from the dilithium salt of 2,2′, 4,4′ tetrahydroxybenzophenone condensed with formaldehyde, and contain less than 5% removable water with respect to their weight when dried to constant weight in vacuo at 20° C.

The EV fluids of the present invention have a number of advantages over EV fluids containing polymers particularly disclosed in U.K. Pat. No. 1,570,234. The polymer particles used in the present fluids are in general terms simpler to manufacture and are more uniform in structure and density, and are thus more easily density-matched with suitable liquids when making up EV fluids. The present fluids exhibit generally improved EV response characteristics. Moreover, the present fluids when made up with polymer particles of low water content possess significantly lower electrical conductivities than the prior art fluids made up with polymer particles of corresponding water content; thus the electrical power consumption across the present fluids is likewise significantly lower in the presence of identical electric fields. Furthermore, the EV response characteristics of the present fluids generally remain fairly constant over a far greater range of Q values (as hereinbefore defined). This is an advantage because as Q increases with temperature in a similar manner for both the present and prior art EV fluids, the EV response characteristics of the present fluids generally remain more constant with temperature, and hence may operate satisfactorily over a wider temperature range.

Figure 2:
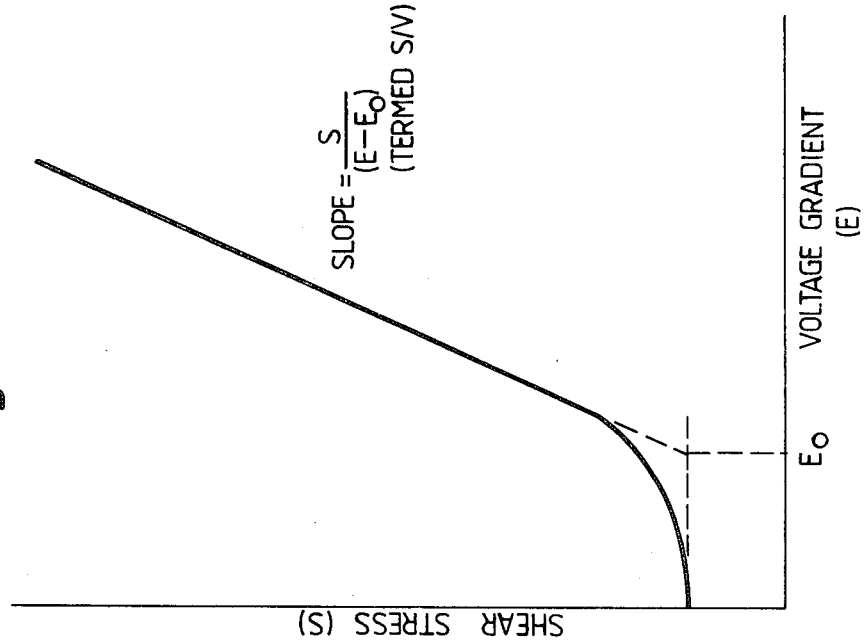

EV fluids according to the present invention and their preparation and properties will now be described by way of example only with reference to the accompanying drawings in which FIG. 1 shows the relationship of shear strength (S) to applied voltage gradient (E) at zero shear, and FIG. 2 shows the relationship of (current per unit area (I)/voltage gradient (E)) to the voltage gradient at zero shear.

Measurements of response were carried out at zero shear using the test rig and operation thereof described in UK Pat. No. 1,501,635 with an electrode gap of 0.5 mm and an electrode area of 78 cm². Additionally, measurements of the dc current passed across the electrode gap over the electrode area were made at the same time as the EV response measurements. Examples 1, 2, and 3 below comprise EV fluids known in the art, and their method of preparation and test performance are included for the purpose of comparison with the present invention. In order to overcome the problem of variable water content of the polymer, and the subsequent difficulty of making valid comparison of EV properties between Examples, each Example is divided into a number of discreet samples of fluid which differ only in terms of the water content of the polymer particles they contain. The water content of the polymer particles is varied over a range set by an upper and lower limit each defined by an approximately standard method of polymer drying applied to all the Examples.

The EV performance of the EV fluids described in the Examples below are expressed in terms of the threshold voltage gradient $E_o$ and the EV response S/V, both shown in FIG. 1, and the two parameters P and Q which relate to the dc current passed by the fluid at the voltage gradient E, as shown in FIG. 2.

The shear stress, S, of an EV fluid is related to the voltage gradient E by the linear relationship $$S = K(E - E_o)$$

over the working range of the fluid above $E_o$. The constant K, otherwise termed S/V can hence be determined from the slope of the shear stress/voltage gradient graph, FIG. 1. If E and $E_o$ are in kV/mm and S in kPa, S/V has the units Pa.mm/V.

The relationship of dc current per unit area, I, to voltage gradient takes the form.

$$I = PE + QE^2$$

or $$I/E = P + QE.$$

This relationship is also substantially linear over the working range of the EV fluids above $E_o$. P and Q are therefore obtained from the intercept on the I/E axis of the extrapolation of the linear position of the I/E against E graph FIG. 2 and the slope of the graph respectively. If I is expressed in $\mu A/cm^2$ (A = amps) and E in kV/mm as befoe, the units pf P and Q are P = nano-amps per volt-meter (nA/V.m)

Q = femto-amps per (volt)² (fA/V²)

where
$$I/E = (P + Q.E) \times 10^{-1}$$

All measurements of EV performance reported below were made at a standard temperature of 30° C. In reported experiments P was found to be independent of temperature, but the variation of Q with temperature was found to obey a Boltzmann-type relationship, defined by the equation III below $$Q_{T_1}/Q_{T_2} = \exp[-E/R(1/T_1 - 1/T_2)] \qquad \text{III}$$

where $T_1$ and $T_2$ are absolute temperatures, R is the gas constant and E is an energy value approximately intermediate between the energy of a hydrogen bond and an ordinary covalent chemical bond, usually about 70 kJ/mole.

The material Aroclor 1242 mentioned below (registered Trade Mark) is a polychlorinated biphenyl fraction, density 1.38 g cm$^{-3}$, viscosity 40 mPa.S, and is marketed by the Monsanto Chemical Corporation.

EXAMPLES 1 TO 3 (COMPARATIVE)

These Examples comprise three of the best examples of prior art EV fluids in terms of their electroviscous and general fluid properties. The preparation and test performance of these Examples is described here for the purposes of comparison with the present invention.

Examples 1, 2 and 3 comprise polymer particles of lithium, sodium, and potassium salts respectively of polymethacrylate chemically cross-linked with N,N$^1$—methylene bisacrylamide (hereinafter referred to as MBA) dispersed in a oleagineous vehicle in a volumetric ratio of 3:10. They are prepared generally in accordance with the method disclosed in the preparation of Example 8 of UK Pat. No. 1,570,234 (polymer particles of lithium polymethacrylate cross-linked with MBA, suspended at 30% V/V in Aroclor 1242 (registered Trade Mark)), using lithium hydroxide monohydrate, sodium hydroxide, and potassium hydroxide each in a molar ratio of 1:1 with the methacrylic acid in the preparation of the polymer particles in Examples 1, 2, and 3 respectively.

The preparation of each Example does however differ from the method disclosed in the preparation of Example 8 of UK Pat. No. 1,570,234 in the following respects.

A molar ratio of 1:6 MBA to methacrylic cid is used in the preparation of the polymer particles, rather than the 1:5 molar ratio disclosed in the above Patent. In using a smaller amount of MBA in each of Examples 1, 2, and 3, the degree of cross-linking in the polymer is reduced which has the effect of increasing the tendency of the polymer to swell in water, and generally increasing the electroviscous response of an EV fluid in which the polymer (as particles) is dispersed. The former effect is undesirable because it makes the polymer particles more difficult to wash and filter during their preparation, but the latter effect is obviously desirable in terms of improving overall EV fluid performance. A 1:6 molar ratio of MBA to methacrylic acid is generally regarded as giving a polymer which exhibits a better compromise between the two effects.

A further important difference lies in the preparation and testing of each fluid after the finely-divided polymer has been washed, filtered and drained. The polymer is then dried for only about half an hour in a fluid bed drier at 60° C. to an arbitrary "wet" state, after which it is ball-milled and sieved in a particle classifier to remove all particles of a size greater than 20 μm and less than 5 μm. A first portion of the polymer particles is then dispersed at 30% V/V in liquid BDM (rather than Aroclor 1242) to comprise a first sample A of EV fluid for each Example, and is immediately subjected to a static test in the above-mentioned test rig in order to measure EV response and the dc current passed at certain electric field strengths. The test is conducted as soon as possible after preparation of the sample to prevent the particles settling out in the BDM because of the differences in density between the two (density matching may if desired be achieved by the balanced addition of other non-conducting oleaginous vehicles known in the art which are fully miscible in BDM). The remainder of the polymer particles is then further dried in a vacuum dessicator at 20° C., from which is withdrawn at certain intervals of time further portions each one of which is made up as further samples B, C, D etc of EV fluid (in order of decreasing water content) and tested in an identical manner described above for sample A. The % water content of the polymer particles in each sample as compared with Sample A (which is allocated an arbitrary 0% water removed) is determined by weighing the remainder of the polymer particles just before and after the withdrawal of each of the further portions. Further samples are made up until it appears that further drying at 20° C. of the polymer particles would not achieve any further appreciable loss in water content (typically after about one week in the vacuum dessicator, depending on the activity of the dessicant), which for the purposes of the preparation defines at arbitrary "dry" state of the polymer. Thus the first sample A and the last sample both contain polymer particles whose water content may be regarded as approximately standardized for all the Examples.

Samples of each of the Examples 1, 2 and 3 were prepared and tested in accordance with the above method, and the results of static tests on these samples are given in Table 1 below. It should be noted that in this specification, S/V is given in Pa.mm/V rather than Pa/V over the 0.5 mm working gap of the above test rig given in UK Pat. No. 1,570,234.

TABLE 1

| Example | Sample | Water removed (% by weight) | S/V (Pa.mm/V) | $E_o$ (kV/mm) | P (nA/V.m) | Q (fA/V$^2$) | @ E = ($E_o$ + 2) kV/mm I/A (μA/cm$^2$) | S (kPa) | @ E = 4 kV/mm I/A (μA/cm$^2$) | S (kPa) |
|---|---|---|---|---|---|---|---|---|---|---|
| 1 | A | 0    | 1.4 ± 0.1  | 0.7 ± 0.15 | −9.5  | 66.1 | 45.6  | 2.8 | 102   | 4.6 |
| 1 | B | 3.7  | 1.8 ± 0.2  | 0.9 ± 0.2  | −1.3  | 19.1 | 15.7  | 3.6 | 30.0  | 5.6 |
| 1 | C | 5.0  | 2.2 ± 0.2  | 1.0 ± 0.2  | −1.9  | 10.0 | 8.43  | 4.4 | 15.2  | 6.6 |
| 1 | D | 6.0  | 2.0 ± 0.2  | 1.0 ± 0.3  | −0.3  | 8.3  | 7.4   | 4.0 | 13.2  | 6.0 |
| 1 | E | 7.5  | 1.9 ± 0.1  | 0.9 ± 0.15 | −0.4  | 5.5  | 4.5   | 3.8 | 8.6   | 5.9 |
| 1 | F | 8.5  | 1.8 ± 0.15 | 0.9 ± 0.2  | −0.06 | 3.24 | 2.71  | 3.6 | 5.2   | 5.6 |
| 1 | G | 10.1 | 1.7 ± 0.1  | 0.9 ± 0.2  | −0.1  | 1.45 | 1.19  | 3.4 | 2.28  | 5.3 |
| 1 | H | 10.5 | 1.65 ± 0.1 | 0.9 ± 0.2  | −0.05 | 1.05 | 0.87  | 3.3 | 1.66  | 5.1 |
| 2 | A | 0    | 1.1 ± 0.05 | 0.55 ± 0.1 | −25.5 | 67.8 | 37.6  | 2.2 | 98.3  | 3.8 |
| 2 | B | 2.5  | 1.4 ± 0.1  | 0.65 ± 0.15| −14.0 | 26.3 | 14.8  | 2.8 | 36.5  | 4.7 |
| 2 | C | 3.6  | 1.5 ± 0.1  | 0.65 ± 0.15| −3.6  | 10.0 | 6.1   | 3.0 | 14.6  | 5.0 |
| 2 | D | 4.5  | 1.4 ± 0.05 | 0.65 ± 0.1 | −2.4  | 6.9  | 4.2   | 2.8 | 10.1  | 4.7 |
| 2 | E | 5.4  | 1.45 ± 0.05| 0.7 ± 0.1  | −0.5  | 3.55 | 2.45  | 2.9 | 5.5   | 4.8 |
| 2 | F | 6.5  | 1.7 ± 0.1  | 0.9 ± 0.2  | −2.0  | 2.95 | 1.90  | 3.4 | 3.92  | 5.3 |

TABLE 1-continued

| Example | Sample | Water removed (% by weight) | S/V (Pa.mm/V) | $E_o$ (kV/mm) | P (nA/V.m) | Q (fA/V$^2$) | @ E = ($E_o$ + 2) kV/mm I/A (μA/cm$^2$) | S (kPa) | @ E = 4 kV/mm I/A (μA/cm$^2$) | S (kPa) |
|---|---|---|---|---|---|---|---|---|---|---|
| 2 | G | 7.3 | 1.7 ± 0.1 | 1.0 ± 0.2 | −0.46 | 1.55 | 1.26 | 3.4 | 2.30 | 5.1 |
| 2 | H | 8.7 | 1.8 ± 0.1 | 1.1 ± 0.2 | −0.25 | 0.65 | 0.55 | 3.6 | 0.94 | 5.2 |
| 3 | A | 0 | 1.0 ± 0.05 | 0.55 ± 0.1 | −31 | 111.0 | 64.3 | 2.0 | 165 | 3.5 |
| 3 | B | 1.9 | 1.1 ± 0.05 | 0.65 ± 0.1 | −10.5 | 26.9 | 16.1 | 2.2 | 38.8 | 3.7 |
| 3 | C | 2.5 | 1.25 ± 0.05 | 0.85 ± 0.15 | −4.3 | 12.9 | 9.3 | 2.5 | 18.9 | 3.9 |
| 3 | D | 3.7 | 1.3 ± 0.1 | 0.8 ± 0.2 | −2.7 | 6.3 | 4.2 | 2.6 | 9.0 | 4.2 |
| 3 | E | 4.7 | 1.3 ± 0.05 | 0.8 ± 0.15 | −1.5 | 4.1 | 2.8 | 2.6 | 6.0 | 4.2 |
| 3 | F | 5.4 | 1.5 ± 0.1 | 0.9 ± 0.15 | −0.6 | 1.91 | 1.43 | 3.0 | 2.82 | 4.6 |
| 3 | G | 7.0 | 1.8 ± 0.2 | 1.5 ± 0.2 | −0.13 | 0.55 | 0.63 | 3.6 | 0.83 | 4.5 |
| 3 | H | 7.8 | 1.6 ± 0.2 | 1.3 ± 0.2 | −0.015 | 0.35 | 0.38 | 3.2 | 0.55 | 4.3 |
| 3 | I | 8.2 | 2.0 ± 0.3 | 1.5 ± 0.4 | +0.12 | 0.32 | 0.43 | 4.0 | 0.56 | 5.0 |
| 3 | J | 9.6 | 2.0 ± 0.2 | 1.7 ± 0.4 | +0.16 | 0.16 | 0.28 | 4.0 | 0.32 | 4.6 |

EXAMPLES 4 TO 13

Examples of EV fluids in accordance with the present invention and comprising polymer particles dispersed in oleaginous vehicles were prepared as follows, beginning with the preparation of the polymer particles.

The polymer particles in each of the Examples 4 to 13 were prepared from the reagents listed in Table 2 below. The quantities used are also listed in Table 2. All the polymers listed in Table 2 are salts of phenols condensed with formaldehyde, which salts of phenols may be individually identified as the mono-lithium, salt of resorcinol in Example 4, the mono-lithium, mono-sodium, tri sodium, and mono-guanidinium salts of α resorcylic acid in Examples 5, 6, 7 and 8 respectively, the mono-lithium, mono-sodium, mono-potassium, and di-lithium salts of 1, 5 dihydroxy naphthalene in Examples 9, 10, 11 and 12 respectively, and the di-lithium salt of 2,2′, 4,4′ tetrahydroxybenzophenone in Example 13.

In each example, the quantities of the phenol reagent and the base reagent as indicated in Table 1 were added to a 2 liter beaker. The contents of the beaker were then stirred and cold water (typically up to 1 liter) was slowly added. In the case of the phenolic salts, the reagents may not fully dissolve until after the addition of the corresponding quantity of 37-40% formaldehyde (formalin), as indicated in Table 2. The formaldehyde was slowly stirred into the mixture. Heating and stirring of the solution continued until a condensation reaction took place, which either started before the solution reached its boiling point or some time after boiling had commenced. In all examples, the condensation reaction was noticeably exothermic and so the beaker was removed from the heat source once the condensation reaction began, and the solution was rapidly stirred until it had thickened to a stiff polymer gel.

TABLE 2

| Example | Phenol Reagent | Base Reagent | Reagent Quantities Phenol (g) | Formalin (ml) | Base (g) | Polymer Specific Gravity |
|---|---|---|---|---|---|---|
| 4 | Resorcinol | LiOH.H$_2$O | 110 | 250 | 42 | 1.44 |
| 5 | αResorcylic Acid | LiOH.H$_2$O | 154 | 250 | 42 | 1.56 |
| 6 | " | NaOH | 154 | 250 | 40 | 1.6 |
| 7 | " | NaOH | 154 | 250 | 120 | 1.8 |
| 8 | " | C(NH$_2$)$_3$CO$_3$ | 154 | 250 | 120 | 1.5 |
| 9 | 1,5,Dihydroxy Naphthalene | LiOH.H$_2$O | 160 | 250 | 42 | 1.38 |
| 10 | 1,5,Dihydroxy Naphthalene | NaOH | 160 | 250 | 40 | 1.5 |
| 11 | 1,5,Dihydroxy Naphthaline | KOH | 160 | 250 | 56 | 1.64 |
| 12 | 1,5,Dihydroxy Naphthalene | LiOH.H$_2$O | 160 | 250 | 84 | 1.47 |
| 13 | 2,2′,4,4′, Tetrahydroxy- benzophenone | LiOH.H$_2$O | 246 | 300 | 84 | 1.48 |

On completion of the condensation reaction, the polymer gel was removed from the beaker, cooled and roughly chopped up into small pieces. About 3 liters of water was added to the polymer gel pieces and the resulting mixture processed in an Ilado Homogeniser at about 10,000 rpm to produce an homogenised suspension of finely-divided polymer in water. The finely divided polymer was then washed free of soluble materials by passing a slow stream of distilled water upwards through the suspension held in a tube of about 10 cm diameter and having a sintered glass disc across its bottom. Distilled water was pumped into the bottom tube through the disc using a peristaltic pump, at a rate sufficient to ensure that the polymer in suspension neither sank to the bottom of the tube nor was carried out of the top of the tube. The washing was continued for about one hour until the polymer was only slightly coloured, and was then recovered by filtration and drained. The above washing method was peculiarly advantageous for those polymer gels which were rather fragile in consistency, and hence tend to pack and clog normal filters. However, with stiffer gels, the suspension resulting from homogenisation was filtered at the pump and washed free of salts, etc. on the filter in the normal way.

From this stage, the finely divided polymer in each of the Examples 4 to 3 was dried, divided into portions, made up as samples of EV fluid at 30% V/V in liquid BDM and tested in the above-mentioned test rig in an identical manner to that described for Examples 1, 2 and 3 above.

Samples of each of the Examples 4 to 13 were prepared and tested in accordance with the above method, except that for Examples 4 to 6 only one sample of EV fluid was prepared and tested, each having been made up with polymer particles all of which had been fully vacuum dried at room temperature. The results of static tests on all these samples are given in Tables 3, 4, and 5 below.

preparation does not require the use of an initiator in order to initiate the condensation reaction, and does not involve extensive washing of the polymer gel prior to drying in order to remove water-soluble matter left over from the reaction. This water-soluble matter has to be removed because it would subsequently cause a great increase in the electrical conductivity of any EV fluid in which the polymer particles were dispersed. A further advantage lies in the uniformity of structure and density of the polymer particles of the present invention, which

TABLE 3

| Example | Sample | Water removed (% by weight) | S/V (Pa.mm/V) | $E_o$ (kV/mm) | P (nA/V.m) | Q (fA/V$^2$) | @ E = ($E_o$ + 2) kV/mm | | @ E = 4 kV/mm | |
|---|---|---|---|---|---|---|---|---|---|---|
| | | | | | | | I/A (μA/cm$^2$) | S (kPa) | I/A (μA/cm$^2$) | S (kPa) |
| 4 | — | — | 1.84 ± 0.15 | 0.97 ± 0.23 | −7.5 ± 9.2 | 16.7 ± 4.1 | 12.8 | 3.7 | 23.7 | 5.5 |
| 5 | — | — | 2.16 ± 0.14 | 0.86 ± 0.15 | −3.4 ± 1.7 | 26.7 ± 0.9 | 20.9 | 4.3 | 41.4 | 6.8 |
| 6 | — | — | 1.55 ± 0.13 | 0.68 ± 0.18 | −1.6 ± 1.5 | 23.0 ± 0.9 | 16.1 | 3.1 | 36.2 | 5.1 |
| 7 | — | — | 1.05 ± 0.06 | 0.72 ± 0.12 | −9.9 ± 3.0 | 26.9 ± 1.7 | 17.2 | 2.1 | 39.1 | 3.4 |
| 8 | — | — | 1.04 ± 0.05 | 1.08 ± 0.15 | −0 ± 0.1 | 1.0 ± 0.04 | 0.95 | 2.1 | 1.6 | 3.0 |

TABLE 4

| Example | Sample | Water removed (% by weight) | S/V (Pa.mm/V) | $E_o$ (kV/mm) | P (nA/V.m) | Q (fA/V$^2$) | @ E = ($E_o$ + 2) kV/mm | | @ E = 4 kV/mm | |
|---|---|---|---|---|---|---|---|---|---|---|
| | | | | | | | I/A (μA/cm$^2$) | S (kPa) | I/A (μA/cm$^2$) | S (kPa) |
| 9 | A | 0 | 1.6 ± 0.1 | 0.7 ± 0.1 | −12.7 | 47.9 | 31.5 | 3.2 | 71.6 | 5.3 |
| 9 | B | 1.3 | 1.9 ± 0.2 | 0.9 ± 0.3 | −4.6 | 17.4 | 13.3 | 3.8 | 26.0 | 5.9 |
| 9 | C | 2.0 | 2.1 ± 0.2 | 1.0 ± 0.2 | −3.1 | 7.9 | 6.2 | 4.2 | 11.4 | 6.3 |
| 9 | D | 3.3 | 2.5 ± 0.1 | 1.1 ± 0.2 | −1.1 | 2.4 | 1.97 | 5.0 | 3.4 | 7.3 |
| 9 | E | 4.3 | 3.1 ± 0.2 | 1.3 ± 0.3 | −0.5 | 0.79 | 0.70 | 6.2 | 1.06 | 8.4 |
| 9 | F | 4.6 | 2.6 ± 0.3 | 1.4 ± 0.3 | −0.19 | 0.63 | 0.66 | 5.4 | 0.93 | 6.8 |
| 9 | G | 5.2 | 2.8 ± 0.3 | 1.5 ± 0.3 | −0.15 | 0.32 | 0.34 | 5.6 | 0.45 | 7.0 |
| 9 | H | 6.6 | 2.7 ± 0.3 | 1.7 ± 0.3 | +0.001 | 0.06 | 0.083 | 5.4 | 0.096 | 6.2 |
| 10 | A | 0 | 1.1 ± 0.1 | 0.4 ± 0.1 | −200 | 760 | 406 | 2.2 | 1140 | 4.0 |
| 10 | B | 1.6 | 1.3 ± 0.1 | 0.5 ± 0.1 | −70 | 229 | 126 | 2.6 | 338 | 4.6 |
| 10 | C | 4.6 | 2.1 ± 0.1 | 0.9 ± 0.2 | −8.8 | 14.5 | 9.6 | 4.2 | 19.7 | 6.5 |
| 10 | D | 5.1 | 2.1 ± 0.1 | 1.0 ± 0.1 | −5.4 | 8.7 | 6.2 | 4.2 | 11.8 | 6.3 |
| 10 | E | 6.7 | 2.3 ± 0.3 | 1.1 ± 0.3 | −1.9 | 2.6 | 1.91 | 4.6 | 3.4 | 6.7 |
| 10 | F | 7.8 | 2.1 ± 0.1 | 1.4 ± 0.3 | −0.88 | 0.91 | 0.75 | 4.2 | 1.10 | 5.5 |
| 11 | A | 0 | 0.7 ± 0.05 | 0.2 ± 0.1 | −156 | 661 | 286 | 1.4 | 995 | 2.7 |
| 11 | B | 2.4 | 1.0 ± 0.05 | 0.4 ± 0.1 | −20.0 | 47.9 | 22.8 | 2.0 | 68.6 | 3.6 |
| 11 | C | 3.7 | 1.4 ± 0.05 | 0.6 ± 0.1 | −5.1 | 9.1 | 4.8 | 2.8 | 12.5 | 4.8 |
| 11 | D | 4.4 | 1.35 ± 0.05 | 0.8 ± 0.2 | −1.5 | 3.5 | 2.32 | 2.7 | 5.0 | 4.3 |
| 11 | E | 5.0 | 1.3 ± 0.1 | 1.0 ± 0.3 | −0.4 | 1.3 | 1.05 | 2.6 | 1.92 | 3.9 |

TABLE 5

| Example | Sample | Water removed (% by weight) | S/V (Pa.mm/V) | $E_o$ (kV/mm) | P (nA/V.m) | Q (fA/V$^2$) | @ E = ($E_o$ + 2) kV/mm | | @ E = 4 kV/mm | |
|---|---|---|---|---|---|---|---|---|---|---|
| | | | | | | | I/A (μA/cm$^2$) | S (kPa) | I/A (μA/cm$^2$) | S (kPa) |
| 12 | A | 0 | (not tested) | | — | — | — | — | — | — |
| 12 | B | 1.6 | 2.1 ± 0.1 | 0.7 ± 0.1 | −8.4 | 19.1 | 11.7 | 4.2 | 27.2 | 6.9 |
| 12 | C | 3.7 | 2.2 ± 0.2 | 1.0 ± 0.4 | −4.5 | 5.5 | 3.6 | 4.4 | 7.0 | 6.6 |
| 12 | D | 4.9 | 2.2 ± 0.2 | 1.0 ± 0.3 | −1.3 | 2.3 | 1.68 | 4.4 | 3.2 | 6.6 |
| 12 | E | 5.8 | 1.9 ± 0.2 | 1.1 ± 0.3 | −0.27 | 0.76 | 0.65 | 3.8 | 1.11 | 5.5 |
| 12 | F | 6.7 | 2.0 ± 0.3 | 1.3 ± 0.5 | −0.18 | 0.40 | 0.38 | 4.0 | 0.57 | 5.4 |
| 12 | G | 7.3 | 2.1 ± 0.2 | 1.3 ± 0.3 | −0.1 | 0.30 | 0.29 | 4.2 | 0.44 | 5.7 |
| 12 | H | 8.8 | 1.7 ± 0.2 | 1.4 ± 0.3 | +0.006 | 0.11 | 0.13 | 3.4 | 0.18 | 4.4 |
| 12 | I | 10.1 | 1.8 ± 0.3 | 1.8 ± 0.7 | +0.012 | 0.03 | 0.048 | 3.6 | 0.053 | 4.0 |
| 13 | A | 0 | 1.53 ± 0.3 | 0.51 ± 0.1 | −48 | 155 | 85.6 | 3.1 | 229 | 5.3 |
| 13 | B | 1.54 | 2.04 ± 0.1 | 0.64 ± 0.1 | −16.6 | 76.8 | 49.1 | 4.1 | 116 | 6.9 |
| 13 | C | 6.11 | 2.75 ± 0.1 | 0.98 ± 0.2 | −3.98 | 8.0 | 5.9 | 5.5 | 11.2 | 8.3 |
| 13 | D | 7.51 | 2.79 ± 0.2 | 0.98 ± 0.2 | −1.4 | 3.14 | 2.37 | 5.6 | 4.5 | 8.4 |
| 13 | E | 8.92 | 2.82 ± 0.2 | 1.0 ± 0.2 | −0.72 | 1.35 | 1.0 | 5.6 | 1.87 | 8.5 |
| 13 | F | 9.64 | 2.84 ± 0.2 | 1.01 ± 0.2 | −0.41 | 0.94 | 0.73 | 5.7 | 1.34 | 8.5 |
| 13 | G | 11.57 | 3.10 ± 0.3 | 1.35 ± 0.3 | −0.12 | 0.25 | 0.24 | 6.2 | 0.35 | 8.2 |
| 13 | H | 13.28 | 3.01 ± 0.3 | 1.44 ± 0.3 | −0.005 | 0.038 | 0.043 | 6.0 | 0.059 | 7.7 |
| 13 | I | 13.75 | 2.75 ± 0.2 | 1.5 ± 0.4 | +0.006 | 0.018 | 0.024 | 5.5 | 0.031 | 6.9 |
| 13 | J | 14.09 | 2.26 ± 0.1 | 1.45 ± 0.3 | +0.002 | 0.007 | 0.009 | 4.5 | 0.012 | 5.8 |

The preparation of the polymer particles used in Examples 4 to 13 described above illustrates a number of qualitative advantages of the present invention. The uniformity is well known as a feature of phenol-formaldehyde polymers generally known in the art. A further portion of each of the polymer particles of Examples 1 to 3 and 4 to 13 was prepared and each density-matched with liquid BDM and other suitable liquids to comprise a further sample of EV fluid. These further samples of EV fluid were left to stand in separate transparent containers, and were visually inspected from time to time. The further samples of Examples 4 to 13 appeared to remain of even consistency over long periods of time due to the uniformity of density of the polymer particles contained in them, whereas those of Examples 1 to 3 soon separated out into particle-rich layers which formed at the bottom and at the surface of the samples.

Referring to Tables 1, 3, 4 and 5, the values of P, Q, S/V and $E_o$ observed and calculated for each sample were used to further calculate corresponding values of S and I/A at two chosen values of E. Those two values of E were 4 kV/mm and at $(E_o+2)$ kV/mm, both of which values were within the working range of field strengths for each sample, ie above $E_o$, but generally below the point at which arcing across the fluid samples may be expected to occur. S and I/A were calculated using the relationships of S with $(E-E_o)$ and I/A with E described above, which relationships remained approximately valid over the range of different voltages applied to each sample. These values of S and I/A appear against each sample on each of the Tables 1, 3, 4, and 5 above, and together with individual values of S/V they provide the primary tools for quantitative comparison between the Examples. The first value of 4 kV/mm for E as chosen to compare the performance of the fluid samples in identical electric field environments. 4 kV/mm is well above the threshold voltage gradients for all the samples tested, but is generally below the gradients at which arcing across the samples may be expected to occur. The second value of $(E_o+2)$ kV/mm for E was chosen in order to compare the fluids at voltage gradient points within the electric field region of EV activity for each sample. In some respects this second value for E for each sample provided a more practical comparison between the fluids, because the variation in magnitude of $(E_o+2)$ kV/mm between samples tended to more closely parallel the variation in tendency to arc. Thus samples which exhibited an increased tendency to arc at moderate field strengths, e.g. at 4 kV/mm, tended also to exhibit lower $E_o$ values which to some extent offset this disadvantage. This particularly applied to samples containing polymer particles with high water content.

Samples of Examples 4 to 13 were observed to exhibit generally higher EV responses in term of S/V than samples of Examples 1 to 3. S/V value of between 1.0 and 3.1 were observed for the former, as opposed to between 1.0 and 2.2 for the latter. Example 1 was confirmed as the best of the Examples 1, 2, and 3 comprising EV fluids known in the art, exhibiting as it did the most desirable combination of high EV response (in terms of S/V) and low electrical conductivity (in terms of I/A) sustained over the tested range of polymer particle water contents. Examples 2 and 3 were also included in Table 1 for the purpose of comparing the Examples 1, 2, and 3 as a first group with Examples 9, 10 and 11 as a second group, where each Example from each group differs only from the others in that group in the identity of the mono alkali cation used to form the polymer salt of the polymer particles.

Examples 4 to 8 are included in Table 3 as examples of EV fluids whose EV response characteristics are generally equivalent to Example 1, though they all displayed significantly higher conductivities in terms of I/A than that sample of Example 1 having an equivalent water content (sample H). Compared with this sample, Examples 4 and 5 exhibited higher EV responses in terms of S/V, and Examples 12, 13, and 14 lower EV responses.

The performance of the second group comprising Examples 9 10 and 11 of Table 4 compared with the first group comprising Examples 1, 2 and 3 of Table 1 as follows. Of the fluids containing mono-lithium polymer salts, Example 9 was clearly shown as an improvement over Example 1, with nearly all the samples of the former Example exhibiting not only higher S/V values than the samples of the latter, but also higher S values and significantly lower I/A values of both E=4 kV/mm and $E=(E_o+2)$ kV/mm. Of the fluids containing mono-sodium polymer salts, the improvement of Example 11 over Example 2 was not so marked, the former exhibiting generally higher S/V values and S values at the two field strengths for all the samples, though offset by particularly high electrical conductivities in those samples containing polymer particles with high water content. Of the fluids containing mono-potassium salts of polymers, Example 11 was shown as generally inferior to Example 3 in terms of both EV response (S/V) and resistance to electrical conductivity, though because the range of S/V values for the samples of each of these examples is generally lower than for the fluid examples containing mono-lithium or mono-sodium salts of polymers, the inferiority of Example 11 is not regarded as a significant disadvantage of the present invention.

In addition to the above Examples 9, 10, and 11 the EV performance of Example 12 as recorded on Table 5 may be included in the second group as containing polymer particles comprising the di-lithium salt of polymers in that group. As it contains a lithium salt, Example 12 may be compared with Example 1. Samples of Example 12 generally exhibited S/V values generally equal to or slightly higher than corresponding samples of Example 1. More significantly, though, all the samples of Example 12 exhibited lower conductivities in terms of I/A at both $E=(E_o+2)$ and $E=4$ kV/mm, especially those samples which contained polymer particles with low water content. The most striking comparison was between the two corresponding arbitrary dry state polymer-containing samples (Samples 1H and 12I) where at E=4 kV/mm, I/A for Sample 12I was of the order of one-thirtieth that for Sample 1H. Furthermore, between samples 12I and 12B, Q increased by approximately 500-fold for a variation in S/V of only ±13%, whereas for the same variation in S/V for Example 1 (between Samples 1G and 1B), Q increased by only about thirteen-fold. Because the relationship between Q and temperature is approximately the same for both Examples as determined by the above equation III, it follows that the EV response characteristics in terms of S/V of most of the samples of Example 12 would have remained far more constant with temperature than corresponding Example 1 samples and would hence operate satisfactorily over a wider temperature range.

Of the Examples 4 to 13, Example 13 exhibited the greatest improvement in EV performance over Example 1, as may be observed from the performance data of the samples of Example 13 recorded on Table 5. Nearly every sample of Example 13 tested exhibited significantly higher S/V and S values, and exceptionally lower I/A values, particularly in those samples containing polymer particles of low water content. Samples 13E to 13J inclusive exhibited particular improvements in these respects; thus it may be stated that for Example 13, polymer particles containing less than about 5% removable water with respect to their arbitrary dry state weight are to be preferred when making up EV fluids. As with Example 12, most of the samples of Example 13 exhibited EV response characteristics which remained fairly constant over a far greater range of Q values than for most of the samples of Example 1, with similar advantageous result. S/V was observed to vary by only about ±6% between samples 13I and 13C, whereas between these samples Q increased by a factor of over 400 fold.

We claim:

1. An electroviscous (EV) fluid composition comprising, in dispersion in an electrically non-conducting hydrophobic oleaginous vehicle, water containing particles of a phenol-formaldehyde polymer having free or neutralized acid groups, a density of not greater than 1.8 g cm$^{-3}$ and a water absorbency such that a sample thereof, after being allowed to equilibrate with moist air at 20° C., loses at least 8% of its weight when heated to constant weight under vacuum at a temperature which does not cause decomposition of the polymer, and regains at least 40% of this loss in weight when exposed to air at an ambient relative humidity of about 60% and a temperature of 20° C., the phenol employed in the formation of said phenol-formaldehyde polymer being an aromatic compound in which at least one of the aromatic hydrogen atoms has been replaced by a hydroxyl group at a first position, and in which at least two aromatic hydrogen atoms remain either in ortho or in ortho and para relationship to the said hydroxyl group.

2. An EV fluid composition according to claim 1 wherein the phenol employed in the formation of the polymer has the general formula I

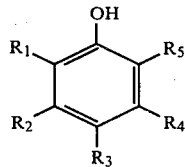

wherein either each of $R_1$–$R_5$ is selected from H, OH, $CO_2H$ and O=C—Ar (Ar being an optionally substituted phenyl group) provided that at least two of $R_1$, $R_3$, and $R_5$ are H or $R_1$ and $R_3$ are H, $R_2$ is selected from H, OH, and $CO_2H$, and $R_4$ and $R_5$ are taken together and are —$CR_6$=$CR_7$—$CR_8$=$CR_9$— wherein each of $R_6$–$R_9$ is selected from H, OH, and $CO_2H$, provided that at least one of $R_6$ to $R_9$ is OH, and at least two of $R_6$–$R_9$ are H in either ortho or ortho and para relationship with the said OH.

3. An EV fluid composition according to claim 2 wherein the phenol is selected from the group comprising phenol (hydroxybenzene), resorcinol, resorcyclic acid, 1,5 dihydroxynaphthalene, or 2,2', 4,4' tetrahydroxybenzophenone.

4. An EV fluid composition according to claim 1 wherein at least a proportion of the acid groups are neutralized by metal or organic cations.

5. An EV fluid composition according to claim 4 wherein the metal comprises a group I metal.

6. An EV fluid composition according to claim 1 wherein the polymer particles contain less than 5% removable water with respect to their weight when dried to constant weight in vacuo at 20° C.

7. An EV fluid composition according to claim 1 wherein the electrically non-conducting hydrophobic oleaginous vehicle contains at least one liquid which is a mixture of components having the general formula II

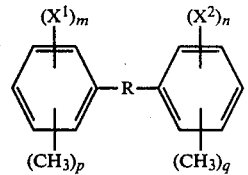

wherein R is selected from $CY_2$, O, S, $SO_2$, $SiF_2$, and O—$Si(Y_2)$—O, $X^1$ is selected from F, Cl, and Br, $X^2$ is selected from F, Cl and Br, (m+n) has an average value of from 1 to 3, each of p and q have an average value of from 0 to 2, (p+q) has an average value of from 0 to 1, and Y is selected from H, F, methyl and ethyl.

8. An EV fluid composition according to claim 7 wherein the at least one liquid comprises a mixture of brominated diphenyl methanes, hereinafter referred to as BDM, in which R is $CH_2$, $X^1$ and $X^2$ are Br, one of m or n is zero, (m+n) has an average value of about one, and both p and q are zero.

9. An EV fluid composition according to claim 8 wherein the electrically non-conducting hydrophobic oleaginous vehicle further comprises at least one second liquid which is miscible with said BDM, the mixture of liquids having a density which is approximately equal to the density of the polymer particles.

10. An EV fluid composition according to claim 8 wherein the polymer particles are dispersed at 30% V/V in said BDM, said particles being formed from the condensation of the dilithium salt of 2,2', 4,4' tetrahydroxybenzophenone with formaldehyde and containing less than 5% removable water with respect to their weight when dried to constant weight in vacuo at 20° C.

* * * * *